United States Patent [19]

Narukawa et al.

[11] Patent Number: 4,823,165
[45] Date of Patent: Apr. 18, 1989

[54] DOCUMENT SIZE DETECTOR FOR COPYING MACHINE

[75] Inventors: Atsushi Narukawa, Nara; Haruo Nishiyama, Kyoto, both of Japan

[73] Assignee: Sharp Kabushiki Kaisha, Osaka, Japan

[21] Appl. No.: 124,962

[22] Filed: Nov. 24, 1987

[30] Foreign Application Priority Data

Nov. 26, 1986 [JP] Japan .............................. 61-282595
Oct. 30, 1987 [JP] Japan .............................. 62-276997

[51] Int. Cl.[4] ............................................. G03B 27/62
[52] U.S. Cl. ........................................ 355/75; 355/41
[58] Field of Search ................................... 355/75, 41

[56] References Cited

U.S. PATENT DOCUMENTS

| | | | |
|---|---|---|---|
| 4,338,020 | 7/1982 | Yukawa et al. | 355/41 |
| 4,511,246 | 4/1985 | Nishiyama | 355/75 |
| 4,568,181 | 2/1986 | Nishiyama | 355/75 |

*Primary Examiner*—Monroe H. Hayes
*Attorney, Agent, or Firm*—Birch, Stewart, Kolasch & Birch

[57] ABSTRACT

A document detector for a copying machine includes a rectangular document support atop the machine housing and being of corner aligning type which has at least first and second side edges orthogonal to each other for the support thereon of a document with corresponding adjoining sides of the document held generally in abutment with the first and second side edges, and a hingedly supported, generally flat cover mounted on the machine housing for covering the document support when the cover is moved to a closed position. The detector includes a light emitting member and a light receiving member both disposed inside the machine housing at a location beneath one of the first and second side edges of the document support, a reflecting medium secured to the cover for reflecting a beam of light, emitted from the light emitting member, towards the light receiving member, a reflector carried inside and by the machine housing and positioned immediately below such one of the side edges of the document support for guiding the light beam from the light emitting member upwardly towards the reflecting medium and also for guiding the light beam, which has been reflected from the reflecting medium, towards the light receiving member, and a circuit for providing an output indicative of the presence of the document on the document support.

5 Claims, 3 Drawing Sheets

DOCUMENT SIZE DETECTOR FOR COPYING MACHINE

BACKGROUND THE INVENTION

The present invention generally relates to a copying machine having a transparent document support of a corner aligning type and, more particularly, to a device incorporated in the copying machine for the detection of the size or the presence or absence of a document on the document support.

The term "corner aligning type" referred to hereinabove and hereinafter is to be understood as meaning the document support which is generally rectangular in shape having four right-angled corners, one of the corners being utilized as an alignment corner with which a corresponding one of the corners of a document to be copied is, when the document is placed on the document support, aligned in readiness for the actual copying operation. This is in contrast to the type of document support, hereinafter referred to as "center aligning type", which is generally rectangular in shape having a pair of opposite ends and a pair of opposite sides, either one of the ends or one of the sides having an index marking with which a center line of a document to be copied has to be aligned when the document is placed on the document support.

(Description of the Prior Art)

A copying machine having an automatic paper selector is well known, which automatically selects not only a copying paper of particular size that suits the size of a document placed on the document support, but also the stroke of movement of either the document support or the image scanner that is appropriate to the size of the document placed on the document support. In such a copying machine, the document size detector is utilized. An example of the prior art document detector used in the copying machine having the center aligning document support is illustrated in FIGS. 6 and 7 of the accompanying drawings in schematic perspective and side views, respectively.

Referring to FIGS. 6 and 7 for the purpose of the discussion of the prior art, the copying machine shown therein comprises a generally rectangular box-like housing having a generally rectangular top panel 1. The top panel 1 has defined therein a rectangular perforation that is closed by a rectangular center aligning document support 2 made of transparent plate glass. The machine housing includes a generally flat cover 3 hinged at one side edge thereof to the machine housing for pivotal movement between closed and opened positions. The cover 3 when in the opened position permits an operator of the machine to be accessible to the document support 2 for the placement or removal of a document 4 on or from the document support 2, respectively, while the cover 3 when in the closed position after the document 4 to be copied has been placed on the document support 2 is operable to press the document 4 against the document support 2 so as to retain the document 4 in position above the document support 2.

The prior art document size detector comprises a plurality of, for example, seven, light emitting elements 17a to 17g, an equal number of light receiving elements 18a to 18g paired with the respective light emitting elements 17a to 17g, and a generally rectangular reflector 19 hinged at one side edge to the machine housing together with the cover 3 for pivotal movement between inoperative and operative positions in association with the pivotal movement of the cover 3. The light emitting elements 17a to 17g are arranged inside the machine housing beneath the document support 2 and extend in a straight row 17 (FIG. 7) lying immediately below the longitudinal center line of the document support 2, and the light receiving elements 18a to 18g are arranged in a row 18 (FIG. 7) at one side marginal area of the top panel 1 adjacent the reflector 19 in a straight row parallel to the row 17 of the light emitting elements 17a to 17g so as to receive beams of light which are emitted respectively from the light emitting elements 17a to 17g and, then, reflected from the reflector 19.

The paired light emitting and receiving elements 17a to 17g and 18a to 18g are so positioned and so spaced that the size of a document placed on the document support 2 can be indicated in terms of the number of the light beams projected from the light emitting elements 17a to 17g towards the associated light receiving elements 18a to 18g by way of the reflector 19 and intercepted by the presence of the document on the document support 3. Respective outputs from the light receiving elements 18a to 18g are nevertheless processed to provide a service signal representative of the particular size of the document which has been detected.

The above described prior art document size detector is satisfactory so far as used in the copying machine having the center aligning document support. However, when the prior art document size detector is applied in the copying machine having the document support of corner aligning type, the following problems will arise.

Specifically, the corner aligning document support requires the row of the light emitting elements 17a to 17g to be so positioned, such as shown by 17' in FIG. 7, as to extend immediately below a longitudinal line laterally offset from the longitudinal center line of the document support 2 towards one side edge of the document support 2 remote from the hinge axis for both of the cover 3 and the reflector 19. Therefore, the mere application of the prior art document size detector in the copying machine having the corner aligning document support may result in that, as best shown in FIG. 7, the light beam projected from each of the light emitting elements 17a to 17g in the row 17' towards the reflector 19 for a given angle of inclination of the reflector 9 relative to the document support 2 forms a smaller angle of incidence relative to the document support 2 than that which might be formed when the row of the light emitting elements are aligned with the longitudinal centerline of the document support as shown by 17. The smaller the angle of incidence formed between the path of travel of the light beam from each light emitting element 17a to 17g towards the reflector 19, the more apt is the light beam to be reflected back from one surface of the document support 2 facing inwardly of the machine housing. The consequence is that the amount of light received by the respective light receiving element 18a to 18g is reduced to such an extent as to result in the failure of the respective light receiving element to operate properly.

In order for the light beams projected from the row 17' of the light emitting elements 17a to 17g, to pass through the document support 2 at the same angle of incidence as that formed in the center aligning document support, not only must the reflector have an increased width as shown by 19' in FIG. 7, but also the row of the light receiving elements 18a to 18g must also be displaced as shown by 18', thereby posing a problem associated with the increase in size of one or both of the machine housing and the reflector.

An additional problem lies in that the prior art document size detector requires a relatively long path of travel of light from any one of the light emitting elements to the associated light receiving element.

SUMMARY OF THE INVENTION

The present invention has been devised with a view to substantially eliminating the above described problems inherent in the prior art document size detector and has for its essential object to provide an improved document size detector for use in the copying machine of a type having the corner aligning document support, which detector is reliable in operation and which requires a reduced path of travel of light from any one of the light emitting elements to the associated light receiving element and is, therefore, compact in size.

To this end, the present invention provides an improved document size detector for a copying machine which comprises a machine housing; a corner aligning document support of generally rectangular configuration made of transparent plate material and mounted atop the machine housing; a cover hingedly supported by the machine housing for movement between closed and opened positions and adapted to cover the document support when in the closed position; a strip of light reflective material secured to the cover at a location which, when the cover is in the closed position, may align with one side portion of the document support to which one side of a document to be copied is abutted; a row of light emitting elements and a row of light receiving elements, one for each of the light emitting elements, said light emitting and receiving elements being positioned at respective optical positions required to form respective optical paths along which light beams projected from the light emitting elements travel towards the light reflective strip after having passed through such one side portion of the document support and, also, along which the light beams having been reflected from the light reflective strip travel towards the associated light receiving elements; and a discriminating means for discriminating the presence or absence of the document, which intercepts each of the optical paths, in reference to output signals from the associated light receiving elements.

In one preferred embodiment of the present invention, the light receiving elements are arranged in the vicinity of the respective light emitting elements in a plane parallel to the document support.

In this construction according to the present invention, the light beams projected from the respective light emitting elements can, when no document to be copied is placed on the document support and the cover is held in the closed position, pass through that one side portion of the document support and be then reflected by the light reflective strip secured to the cover. Since the light receiving elements receive the respective light beams which have been reflected by the light reflective strip, the level of an output from any one of the light receiving elements which have received the reflected light beams varies depending on whether or not the document is placed on the document support. The discriminating means can determine the presence or absence of the document, which intercepts one or more of the paths of travel of the light beams, in reference to the output signal from at least one of the light receiving elements. At this time, the light beam projected from any one of the light emitting elements passes through that one side portion of the document support in a direction orthogonal to the document support and, therefore, any possible adverse influence which may be brought about by the reflection of light from any one of the opposite surfaces of the document support can be minimized. Moreover, since the reflective strip is secured to one side portion of the cover in alignment with that one side portion of the document support, no extra space for the installation of the reflective strip is required.

According to another preferred embodiment of the present invention, there is provided an improved document size detector for a copying machine which comprises a machine housing; a corner aligning document support of generally rectangular configuration made of transparent plate material and mounted atop the machine housing; a cover hingedly supported by the machine housing for movement between closed and opened positions and adapted to cover the document support when in the closed position; a strip of light reflective material secured to the cover at a location which, when the cover is in the closed position, may align with one side portion of the document support to which one side of a document to be copied is abutted; an optical means for forming a forward-going optical path and a rearward-going optical path each of said forward-going and rearward-going optical paths extending through said one side portion of the document support and reflected from the light reflective strip; at least one st of light emitting and receiving elements, said light emitting element being disposed at a starting point of the forward-going optical path formed by the optical means, said light receiving element being disposed at a terminating point of the rearward-going optical path formed by the optical means; and a discriminating means for discriminating the presence or absence of the document, which intercepts each of the optical paths, in reference to an output signal from the light receiving element.

The differentiation of the forward-going optical path, along which the light beam emitted from the light emitting element travels towards the light reflective strip, from the rearward-going optical path along which the light beam reflected by the light reflective strip travels towards the light receiving element is effective to eliminate any possible orthogonal intersection of any one of the forward going and rearward-going optical paths with the document support. This arrangement is effective to avoid the possibility that stray rays of light reflected from any one of the opposite surfaces of the document support may enter the light receiving element.

In view of the foregoing, as compared with the case with no document placed on the document support, the rays of light projected from the light emitting element will not substantially enter the light receiving element when the document is placed on the document support, and the ratio of the amount of light incident on the light receiving element during the absence of the document on the document support relative to that during the presence of the document on the document support will take a considerably high value.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE EMBODIMENTS

Figure 1:
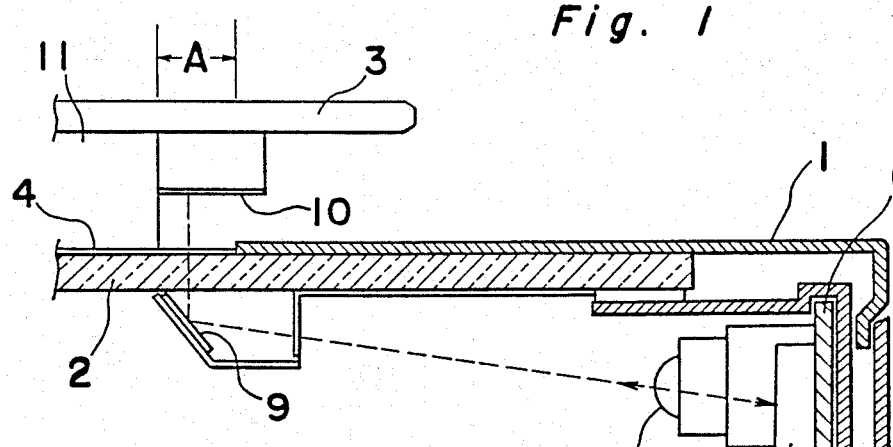
FIG. 1 is a schematic sectional view showing a portion of a copying machine in which a document size detector according to a first preferred embodiment of the present invention is incorporated, which view corresponds to a cross-sectional view taken along the line I—I in FIG. 3.

Before the description of any one of the preferred embodiments of the present invention proceeds, it is to be noted that like parts are designated by like reference numerals throughout the accompanying drawings.

Figure 2:
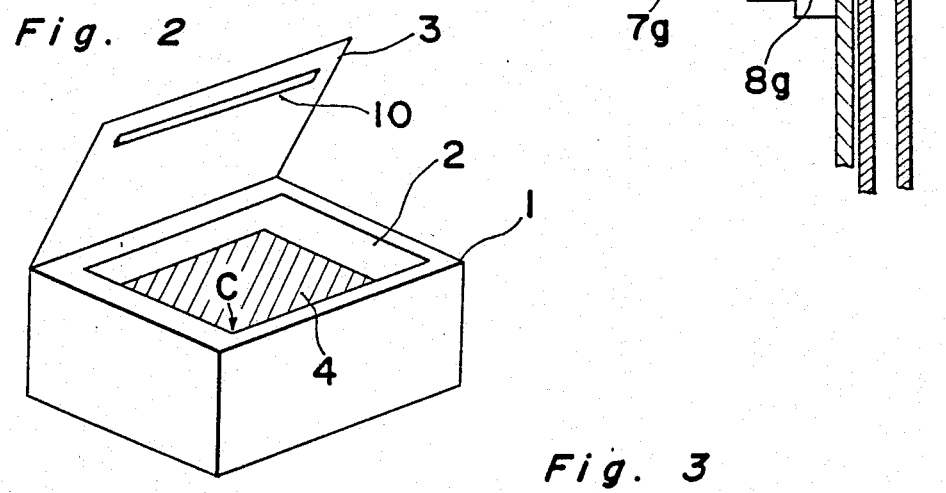
FIG. 2 is a schematic perspective view of the copying machine with a cover held in an opened position.

Referring first to FIG. 2, a copying machine to which the present invention is applicable comprises a generally rectangular box-like housing having a generally rectangular top panel 1. The top panel 1 has defined therein a rectangular perforation that is closed by a rectangular corner aligning document support 2 made of transparent plate glass. The machine housing includes a generally flat cover 3 hinged at one side edge thereof to the machine housing for pivotal movement between closed and opened positions. The cover 3 when in the opened position permits an operator of the machine to be accessible to the document support 2 for the placement or removal of a document 4 on or from the document support 2, respectively, while the cover 3 when in the closed position after the document 4 to be copied has been placed on the document support 2 is operable to press the document 4 against the document support 2 so as to retain the document 4 in position above the document support 2.

When the document 4 to be copied is to be placed on the document support 2, one of the four corners of the document support 2, shown by C, is utilized for the alignment with a corresponding one of the four corners of the document 4 being placed on the document support 2. Thus, it is clear that, in the corner aligning document support 2 such as shown, the adjoining side edges of the document 4 are held in engagement with the correspondingly adjoining side edges of the document support 2 when the document 4 is placed on the document support with such one of the four corners thereof aligned with such corner C of the document support.

Figure 3:
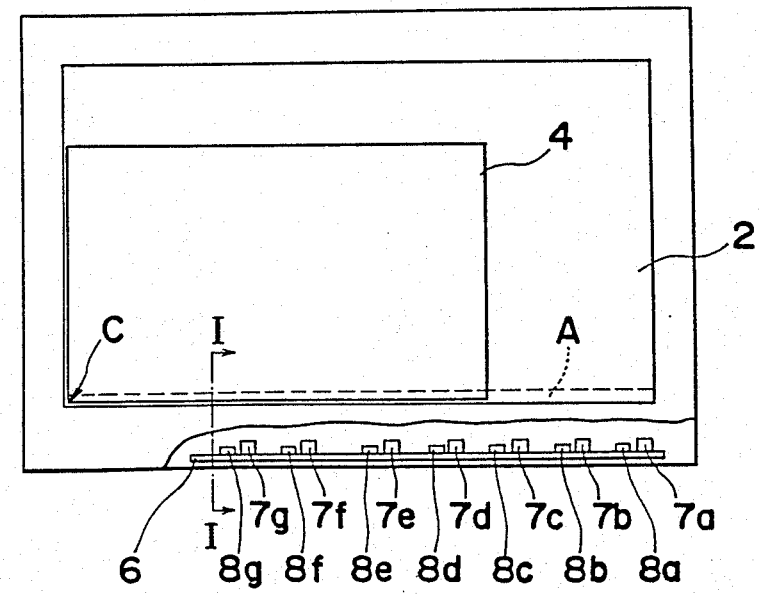
FIG. 3 is a schematic top plan view, with a portion cut away, of the copying machine with the cover removed.

Referring now to FIG. 3, a document size detector comprises a plurality of, for example, seven, light emitting elements 7a to 7g, and light receiving elements 8a to 8g equal in number to, and paired with, the light emitting elements 7a to 7g. The light emitting elements 7a to 7g which may be light emitting diodes are carried in a row by the machine housing through a generally elongated circuit board 6 which is in turn secured within the machine housing immediately beneath one side marginal area of the top panel 1 remote from the hinge side for the cover 3 so as to extend parallel to the longitudinal axis of the document support 2. Similarly, the light receiving elements 8a to 8g which may be photo-diodes are mounted on the circuit board 6 so as to alternate with the light emitting elements 7a to 7g, respectively.

Figure 6:
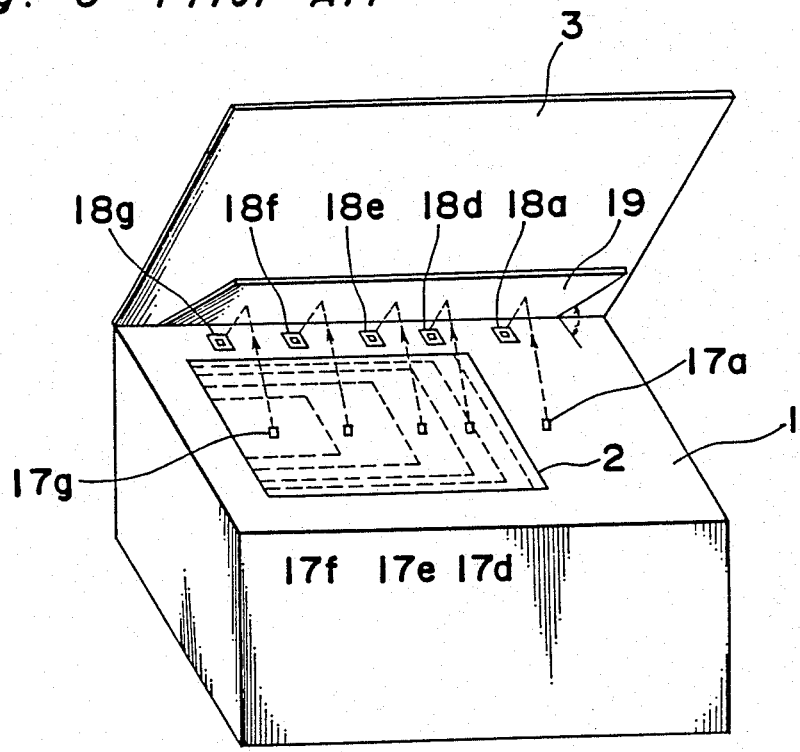
FIGS. 6 and 7 are schematic perspective and side views, respectively, showing the copying machine in which the prior art document size detector is used.
Figure 7:
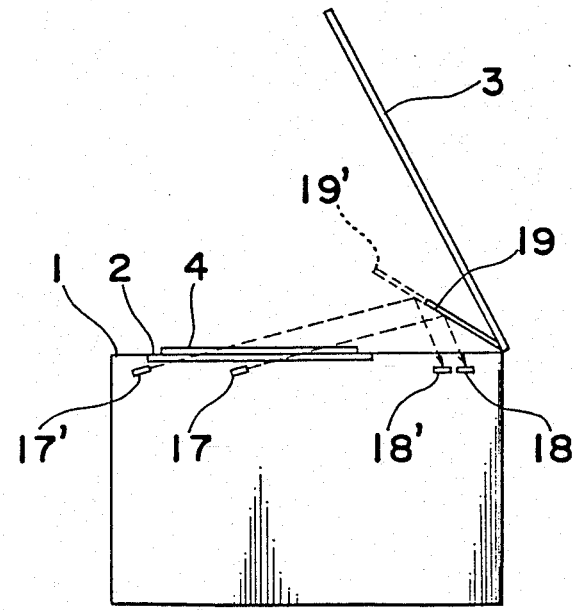

As is the case with the prior art document size detector shown in and discussed with reference to FIGS. 6 and 7, the paired light emitting and receiving elements 7a to 7g and 8a to 8g are so positioned and so spaced that the size of a document placed on the document support 2 can be indicated in terms of the number of the optical paths of travel of light between the elements 7a to 7g to the associated elements 8a to 8g, which are intercepted by the presence of the document on the document support 3.

As best shown in FIG. 1, one side portion of the flat cover 3 remote from the hinge axis therefor is provided with a strip 10 of light reflective material secured thereto in any suitable manner, or otherwise integrally formed therewith, so as to extend parallel to the longitudinal axis of the document support 2 and so as to extend along such one side marginal area of the top panel 1, when the flat cover 3 is in the closed position, while facing downwards towards one side region A of the document support 2 adjacent said side marginal area of the top panel 1.

This light reflective strip 10 is used to reflect a beam of light, projected from any one of the light emitting elements 7a to 7g, back towards the associated light receiving element 8a to 8g. For this purpose, a generally elongated reflecting mirror 9 is carried by the machine housing and positioned immediately below the side region A of the document support 2 for directing the light beam, emitted from any one of the light emitting elements 7a to 7g, towards the reflective strip 10 and, also, directing the light beam, reflected from the reflective strip 10, towards the associated light receiving element 8a to 8g when and so long as the flat cover 3 is in the closed position with no document intervening between the flat cover 3 and the document support. The reflecting mirror 9 operable in the manner as hereinabove described is so inclined relative to the document support 2 as to permit an optical path between it and the reflective strip 10 to lie orthogonal to the document support 2, that is, so as to permit the light beam, reflected from the reflecting mirror 9 towards the reflective strip 10, to travel back from the reflective strip 10 towards the reflecting mirror 9 along one and the same optical path.

Thus, it will readily be understood that, under the circumstances in which the document 4 to be copied has been placed on the document support 2 with its adjoining side edges held in engagement with the correspondingly adjoining side edges of the document support 2 as best shown in FIG. 3 and the flat cover 3 has been subsequently moved to the closed position with the document 4 laid flat against the document support 2, some of the light beams emitted from the respective light emitting elements 7a to 7g, that is, those from the light emitting elements 7d to 7g, are intercepted by the presence of the document 4 on the document support, while the remaining light beams from the light emitting elements 7a to 7c are, after having impinged upon the reflective strip 10 through the reflecting mirror 9, allowed to reflect from the reflective strip towards the associated light receiving elements 8a to 8c by way of the reflecting mirror 9 and, then, to impinge upon such associated light receiving elements 8a to 8c.

It is to be noted that, although the optical paths are formed at the side region A of the document support 2 for the passage of the light beams from the light emitting elements 7a to 7g to the reflective strip 10 and from the reflective strip 10 to the light receiving elements 8a to 8g and an image born on one side portion of the document 4 corresponding in position to the side region A will not be optically transmitted to a photosensitive medium and will not therefore be reproduced on a copying paper, this does not mean that there is a reduction in area in which the copying can be attained because that side portion of the document 4 corresponds in position to a void area of the copying paper which is utilized for the separation of the copying paper from the photosensitive medium.

Figure 4:
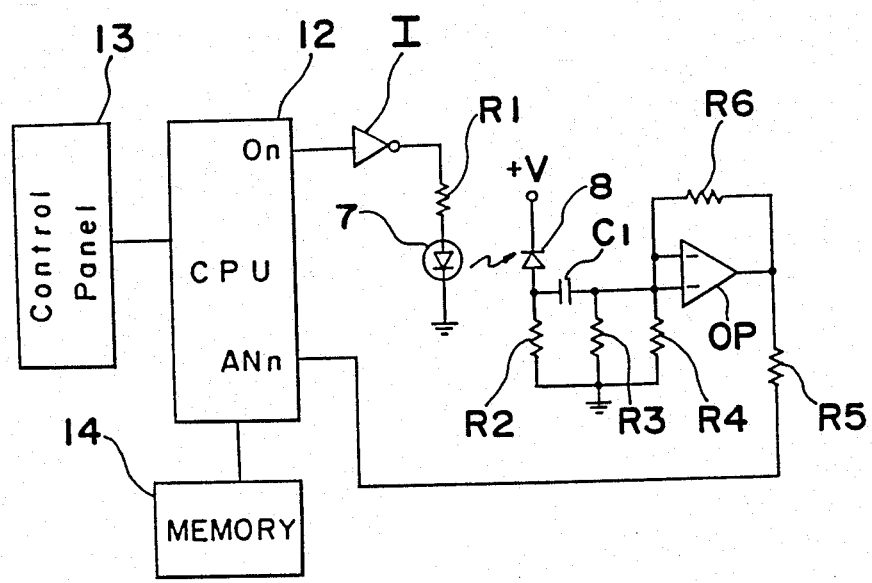
FIG. 4 is a circuit block diagram showing an electric circuit used in the document size detector.

An electric circuit for energizing some or all of the light emitting elements 7a to 7g and also for processing the output signals from some or all of the light receiving elements 8a to 8b is illustrated in FIG. 4. It is, however, to be noted that, for the sake of brevity, only one circuit in which only one pair of the light emitting and receiving elements as shown by 7 and 8, respectively, the element 7 corresponding to any one of the light emitting elements 7a to 7g and the element 8 corresponding to any one of the light receiving elements 8a to 8g.

Referring now to FIG. 4, the detector circuit shown therein comprises a central processing unit 12 which may be a microcomputer operable according to a predetermined program stored in a program area of a storage memory 14 and which performs a detecting operation for the detection of the size of the document 4 on the document support 2 at a required timing when a control panel 13 is manipulated.

The central processing unit 12 has a plurality of output terminals, only one of which is shown by On as connected with the light emitting element 7 through an inverter I and a resistor R1, and a plurality of input terminals, only one of which is shown by ANn as associated with the light receiving element 8. In practice, the number of the output terminals On corresponds to the number of the light emitting elements actually used, and the number of the input terminals ANn corresponds to the number of the light receiving elements actually used. In this arrangement so far described, when the central processing unit 12 renders the output terminal On to be in a low level state, the inverter I generates a high level signal which is in turn applied through the resistor R to the light emitting element 7 to cause the latter to emit a beam of light.

The light receiving element 8 is applied with a reverse bias voltage through a resistor R2. An operational amplifier OP has a non-inverting input terminal to which a voltage signal appearing at the junction between the anode of the light receiving element 8 and the resistor R2 is applied after a direct current component of such voltage signal has been cut off by a circuit including a capacitor C1 and a resistor R3. This operational amplifier OP has a feedback circuit defined by series-connected resistors R6 and R4 whose values determine the $\mu$-factor at which the operational amplifier OP amplifies the input signal. An output signal from the operational amplifier OP is applied through a resistor R5 to the analog input terminal ANn of the central processing unit 12. The central processing unit 12, when receiving the output signal from the operational amplifier 12, performs a comparison of the output signal from the operational amplifier 12 with a predetermined reference value to determine the level of light received by the light receiving element 8.

It is to be noted that the illustrated circuit excluding the central processing unit 12, the control panel 12 and the memory 14 is in practice utilized for each pair of the light emitting and receiving elements shown in FIGS. 1 and 3.

Figure 5:
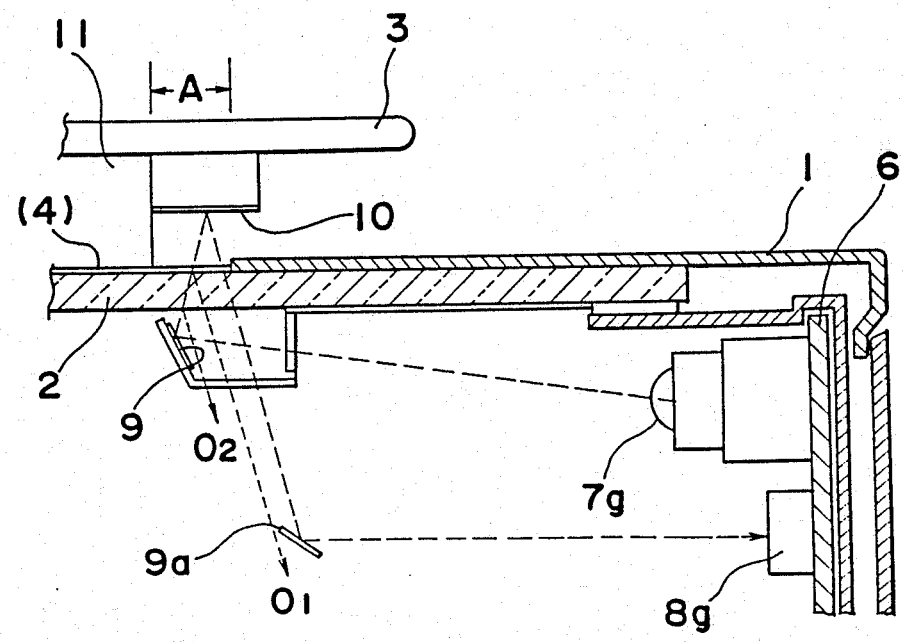
FIG. 5 is a view similar to FIG. 1, showing a second preferred embodiment of the present invention.

In the embodiment which is shown in FIG. 5, the light receiving elements 8a to 8g are positioned generally below the associated light emitting elements 7a to 8b and the reflecting mirror 9 is so positioned and so inclined relative to the document support 2 as to form the optical path between it and the reflective strip 10, when the cover 3 is held in the closed position, to lie at an angle relative to the document support 2 so that unwanted rays of light reflected from any one of the opposite surfaces of the document support 2 can be prevented from entering the light receiving elements 8a to 8g.

To this end, an additional mirror 9a is employed for directing the light beam, which has originated from any one of the light emitting elements 7a to 7g and which has subsequently been reflected from the reflective strip 10, towards the associated light receiving element 8a to 8g while portions of the light beam which have been reflected from the opposite surfaces of the document support 2 will not reach the additional mirror 9a as indicated by $O_1$ and $O_2$. This additional mirror 9a is supported beneath the document support 2 at a level below the reflective strip 9 and may be in the form of a narrow strip of mirror or, alternatively, separate mirror pieces one for each light receiving element 8a to 8g.

Even in this embodiment shown in and described with reference to FIG. 5, the detector circuit shown in and described with reference to FIG. 4 is equally applicable.

Although the present invention has fully been described in connection with the preferred embodiments thereof with reference to the accompanying drawings, it is to be noted that various changes and modifications are apparent to those skilled in the art. By way of example, one or both of the reflecting mirror and the reflective strip, although employed in the form of a single elongated member, may be comprised of separate members one for each of the light receiving elements.

Also, the present invention can be applicable not only for the detection of the size of the document, but also for the detection of the presence or absence of the document on the document support.

Accordingly, such changes and modifications are to be understood as included within the scope of the present invention as defined by the appended claims, unless they depart therefrom.

What is claimed is:

1. A document size detector for a copying machine comprising:
   a machine housing;
   a corner aligning document support of a generally rectangular configuration made of transparent plate material and mounted atop the housing;
   a cover hingedly supported by the housing for movement between closed and opened positions and adapted to cover the document support when in the closed position;

a strip of light reflective material secured to the underside of the cover at a location which, when the cover is in the closed position, will align with one side of the corner aligning document support to which one side of a document to be copied is abutted, said one side being opposite to a hinge of the cover;

first and second intermediate optical reflector means for forming a forward-going optical path and a rearward-going optical path, respectively, each of said forward-going and rearward-going optical paths extending through said one side of the document support for reflection from the strip of light reflective material within a short distance;

at least one set of light emitting and receiving elements, said light emitting element being disposed at a starting point of the forward-going optical path formed by the first intermediate optical reflector means, said light receiving element being disposed at a terminating point of the rearward-going optical path formed by the second intermediate optical reflector means; and discriminating means for discriminating the presence or absence of the document, which intercepts each of the optical paths, in reference to an output signal from the light receiving element;

whereby said document size detector may be confined to an area underneath only one side of the document support, thereby ensuring an accurate detection of the document size.

2. The detector as claimed in claim 1, wherein said discriminating means detects the size of the of the document in reference to the signals fed from the light receiving elements.

3. A document detector for a copying machine including a machine housing and a generally rectangular document support mounted atop the machine housing, said document support being of a corner aligning type having at least first and second side edges orthogonal to each other for the support thereon of a document to be copied with corresponding adjoining sides of the document held generally in abutment with the first and second side edges, said machine housing having a hingedly supported, generally flat cover for covering the document support when the cover is moved to a closed position, which detector comprises:

a light emitting means and a light receiving means both disposed inside and on a side wall of the machine housing at a location beneath one of the side edges of the document support, said one of the side edges being disposed opposite to the side of the document support which hingedly supports the cover;

a reflecting medium secured to the cover at said one side for reflecting a beam of light emitted form the light emitting means towards the light receiving means;

intermediate optical reflecting means carried inside and by the machine housing and positioned immediately below said reflecting medium and said one side edge of the document support for guiding the light beam from the light emitting means upwardly towards the reflecting medium and also for guiding the light beam, which has been reflected from the reflecting medium, towards the light receiving means; and circuit means, operable in response to an output signal from the light receiving means, for providing an output indicative of the presence of the document on the document support when the light beam travelling from the light emitting means towards the reflecting medium through the intermediate optical reflecting means is intercepted by a corresponding one of the adjoining sides of the document placed on the document support;

whereby said document size detector may be confined to an area underneath only one side of the document support, thereby ensuring an accurate detection of the document size while minimizing the space requirements for said detector.

4. The document detector as claimed in claim 3, wherein said light emitting means comprises a plurality of light emitting diodes and said light receiving means comprises photo-diodes equal in number to the light emitting diodes, said light emitting diodes being arranged in a row extending in a direction parallel to said one side of the document support, said photo-diodes being so positioned as to alternate with the associated light emitting diodes in a side-by-side fashion, and wherein said reflecting means comprises a strip of mirror extending in a direction parallel to the row of the light emitting diodes, said strip of mirror being so inclined relative to the document support as to permit the path of travel of the light beam between said strip of mirror and the reflecting medium to extend orthogonally across the document support.

5. The document detector as claimed in claim 3, wherein said light emitting means comprises a plurality of light emitting diodes and said light receiving means comprises photo-diodes equal in number to the light emitting diodes, said light emitting diodes being arranged in a row extending in a direction parallel to said one side of the document support, said photo-diodes being positioned immediately below the associated light emitting diodes, and wherein said intermediate optical reflecting means comprises first and second strips of mirror both extending parallel to each other and in a direction parallel to the row of the light emitting diodes, said first strip of mirror being operably supported relative to the document support to reflect the light beam emitted form any one of the light emitting diodes towards the reflecting medium and across the document along a path inclined at an acute angle relative to the document support, and said second strip of mirror being operable to reflect only that portion of the light beam which has been reflected by the reflecting medium and which has subsequently reached the second strip of mirror along a path different from the path of travel of the light beam from the first strip of mirror towards the reflecting medium, towards the light receiving element.

* * * * *